(12) United States Patent
Moore et al.

(10) Patent No.: US 6,546,081 B2
(45) Date of Patent: Apr. 8, 2003

(54) TELEPHONE SECURITY SYSTEM

(76) Inventors: Robert P. Moore, 316 W. Browning Rd., Bellmawr, NJ (US) 08031; Theodore M. Moore, 316 W. Browning Rd., Bellmawr, NJ (US) 08031

( * ) Notice: Subject to any disclaimer, the term of this patent is extended or adjusted under 35 U.S.C. 154(b) by 112 days.

(21) Appl. No.: 09/751,742

(22) Filed: Dec. 29, 2000

(65) Prior Publication Data
US 2002/0085684 A1 Jul. 4, 2002

(51) Int. Cl.[7] .............................................. H04M 11/00
(52) U.S. Cl. ...................... 379/37; 379/52; 379/374.03; 340/407.1; 340/7.6
(58) Field of Search ............................. 379/37, 38, 39, 379/42, 43, 44, 48, 52, 110.01, 372, 373.01, 373.02, 374.03, 375.01, 376.01, 376.02, 396; 455/567; 340/539, 540, 541, 545, 407.1, 7.6, 825.19

(56) References Cited

U.S. PATENT DOCUMENTS

| | | |
|---|---|---|
| 2,550,076 A | 4/1951 | Mccarron |
| 3,582,557 A | 6/1971 | Friberg |
| 4,057,798 A | 11/1977 | Ellson |
| 4,421,953 A * | 12/1983 | Zielinski ........................ 379/52 |
| 4,493,947 A | 1/1985 | Loveless |
| 5,283,816 A | 2/1994 | Gomez Diaz |
| 5,373,488 A * | 12/1994 | Lidor ........................... 379/40 |
| D378,753 S | 4/1997 | Diblasi et al. |
| 5,686,882 A * | 11/1997 | Giani ........................... 340/539 |
| 5,877,695 A * | 3/1999 | Kubes et al. ................ 455/566 |
| 5,999,094 A * | 12/1999 | Nilssen ......................... 379/37 |

* cited by examiner

Primary Examiner—Stella Woo

(57) ABSTRACT

A telephone security system for providing an alarm system connected to the telephone. The telephone security system includes a telephone being adapted to be connected to a telephone line and having a housing and a face plate member being removably disposed upon a top of the housing; and also includes a control member being adapted to be connected to the telephone line: and further includes a detection assembly being connected to the ringer-inducer member for sensing an emergency; and also includes a user notification assembly being connected to the telephone for notifying a user of an emergency.

17 Claims, 3 Drawing Sheets

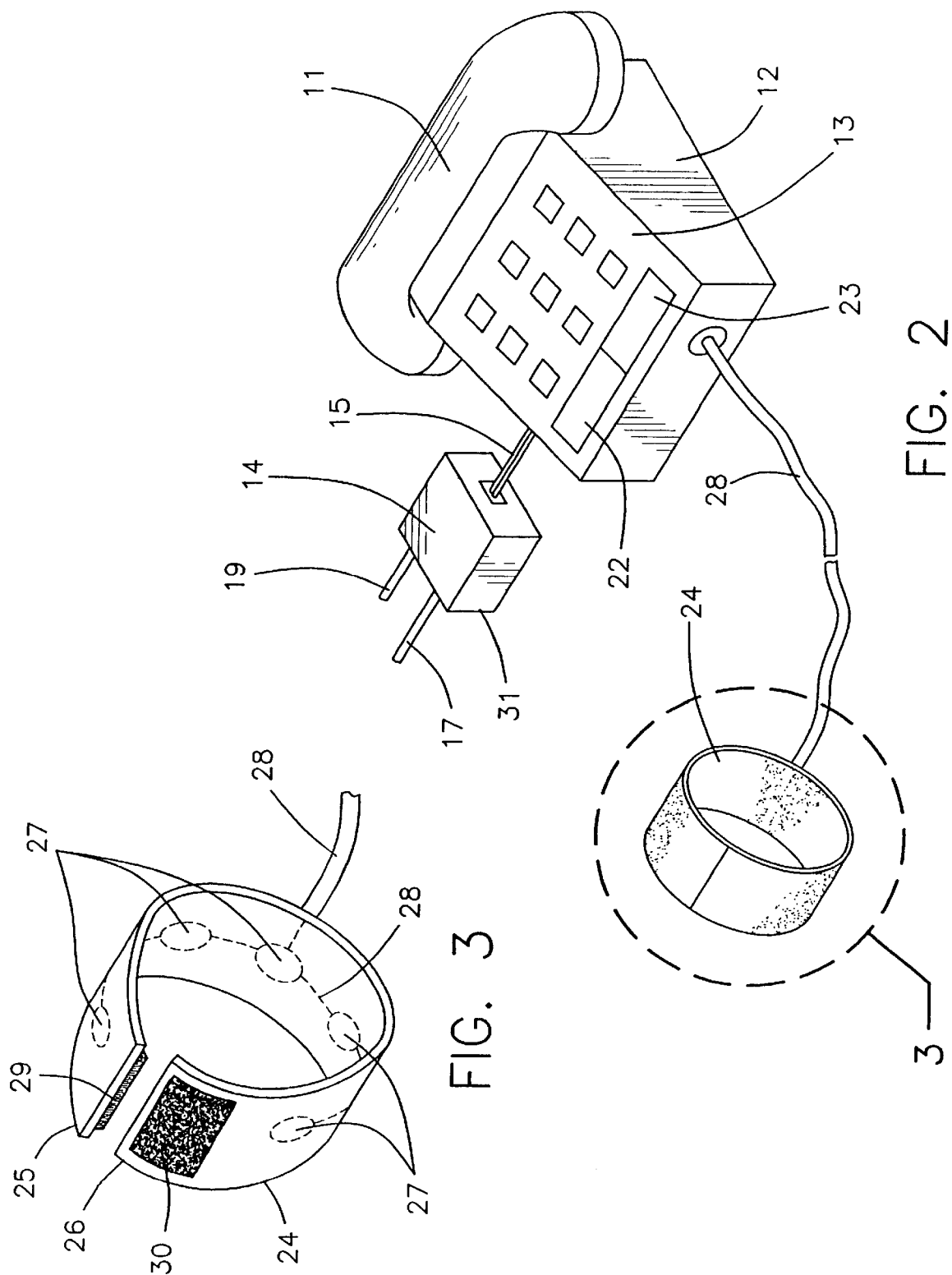

TELEPHONE SECURITY SYSTEM

BACKGROUND OF THE INVENTION

1. Field of the Invention

The present invention relates to a telephone ring sensing savior and more particularly pertains to a new telephone security system for providing an alarm system connected to the telephone.

2. Description of the Prior Art

The use of a telephone ring sensing savior is known in the prior art. More specifically, a telephone ring sensing savior heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,283,816; U.S. Pat. No. 3,582,557; U.S. Pat. No. 2,550,076; U.S. Pat. No. 4,493,947; U.S. Pat. No. 4,057,798; and U.S. Pat. No. Des. 378,753.

While these devices fulfill their respective, particular objectives and requirements, the aforementioned patents do not disclose a new telephone security system. The inventive device includes a telephone being adapted to be connected to a telephone line and having a housing and a face plate member being removably disposed upon a top of the housing; and also includes a control member being adapted to be connected to the telephone line; and further includes a detection assembly being connected to the ringer-inducer member for sensing an emergency; and also includes a user notification assembly being connected to the telephone for notifying a user of an emergency.

In these respects, the telephone security system according to the present invention substantially departs from the conventional concepts and designs of the prior art, and in so doing provides an apparatus primarily developed for the purpose of providing an alarm system connected to the telephone.

SUMMARY OF THE INVENTION

In view of the foregoing disadvantages inherent in the known types of telephone ring sensing savior now present in the prior art, the present invention provides a new telephone security system construction wherein the same can be utilized for providing an alarm system connected to the telephone.

The general purpose of the present invention, which will be described subsequently in greater detail is to provide a new telephone security system which has many of the advantages of the telephone ring sensing savior mentioned heretofore and many novel features that result in a new telephone security system which is not anticipated, rendered obvious, suggested, or even implied by any of the prior art telephone ring sensing savior, either alone or in any combination thereof.

To attain this, the present invention generally comprises a telephone being adapted to be connected to a telephone line and having a housing and a face plate member being removably disposed upon a top of the housing; and also includes a control member being adapted to be connected to the telephone line; and further includes a detection assembly being connected to the ringer-inducer member for sensing an emergency; and also includes a user notification assembly being connected to the telephone for notifying a user of an emergency.

There has thus been outlined, rather broadly, the more important features of the invention in order that the detailed description thereof that follows may be better understood, and in order that the present contribution to the art may be better appreciated. There are additional features of the invention that a will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telephone security system which has many of the advantages of the telephone ring sensing savior mentioned heretofore and many novel features that result in a new telephone security system which is not anticipated, rendered obvious, suggested, or even implied by any of the prior art telephone ring sensing savior, either alone or in any combination thereof.

It is another object of the present invention to provide a new telephone security system which may be easily and efficiently manufactured and marketed.

It is a further object of the present invention to provide a new telephone security system which is of a durable and reliable construction.

An even further object of the present invention is to provide a new telephone security system which is susceptible of a low cost of manufacture with regard to both materials and labor, and which accordingly is then susceptible of low prices of sale to the consuming public, thereby making such telephone security system economically available to the buying public.

Still yet another object of the present invention is to provide a new telephone security system which provides in the apparatuses and methods of the prior art some of the advantages thereof, while simultaneously overcoming some of the disadvantages normally associated therewith.

Still another object of the present invention is to provide a new telephone security system for providing an alarm system connected to the telephone.

Yet another object of the present invention is to provide a new telephone security system which includes a telephone being adapted to be connected to a telephone line and having a housing and a face plate member being removably disposed upon a top of the housing; and also includes a control member being adapted to be connected to the telephone line; and further includes a detection assembly being connected to the ringer-inducer member for sensing an emergency; and also includes a user notification assembly being connected to the telephone for notifying a user of an emergency.

Still yet another object of the present invention is to provide a new telephone security system that effectively makes use of all the telephones on the premises to warn the occupants of an emergency situation.

Even still another object of the present invention is to provide a new telephone security system that allows the user to distinguish between emergency and non-emergency situations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is another perspective view of the present invention.

FIG. 3 is a detailed perspective view of the wrist band of the present invention.

DESCRIPTION OF THE PREFERRED EMBODIMENT

Figure 1:
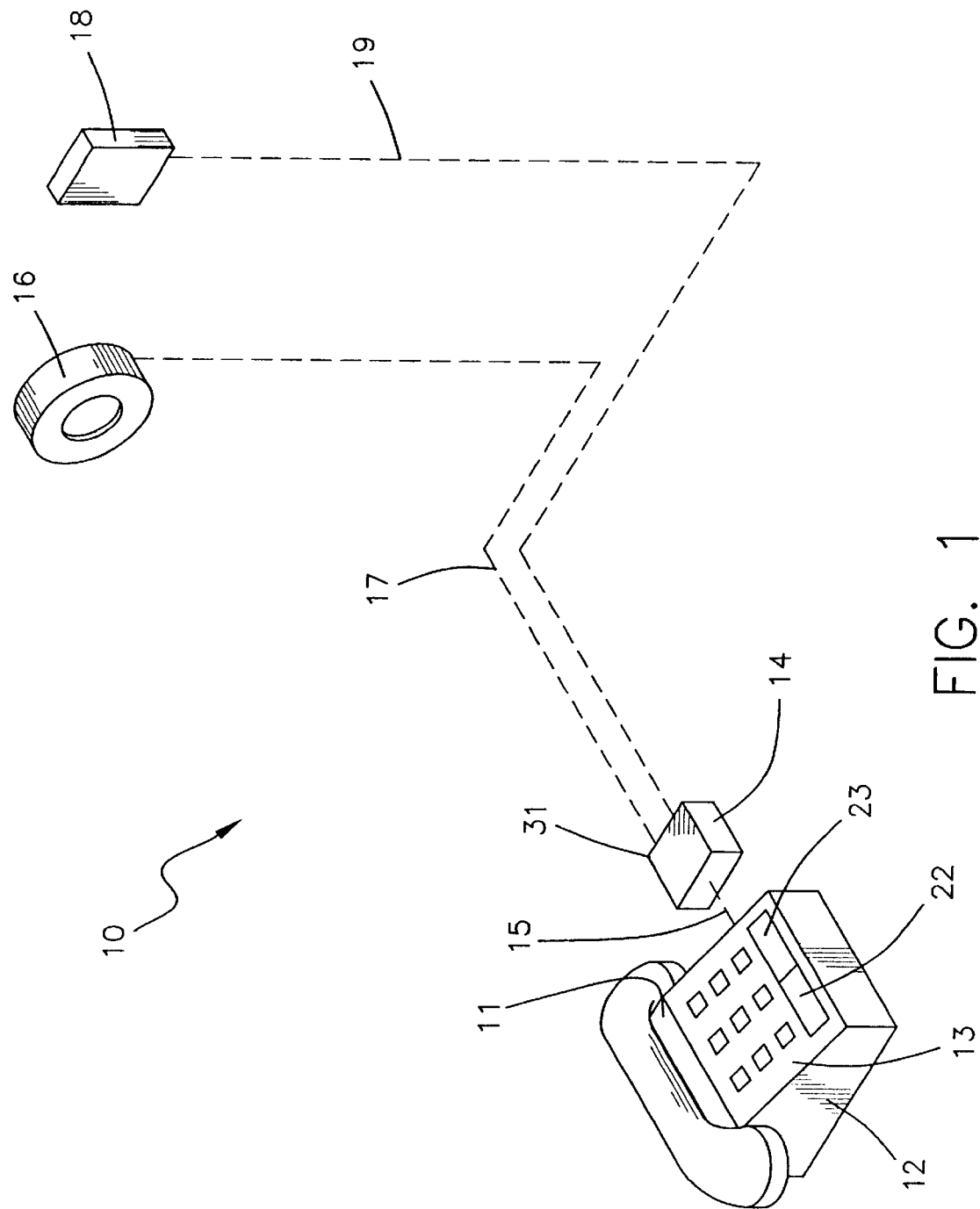
FIG. 1 is a perspective view of a new telephone security system according to the present invention.
Figure 4:
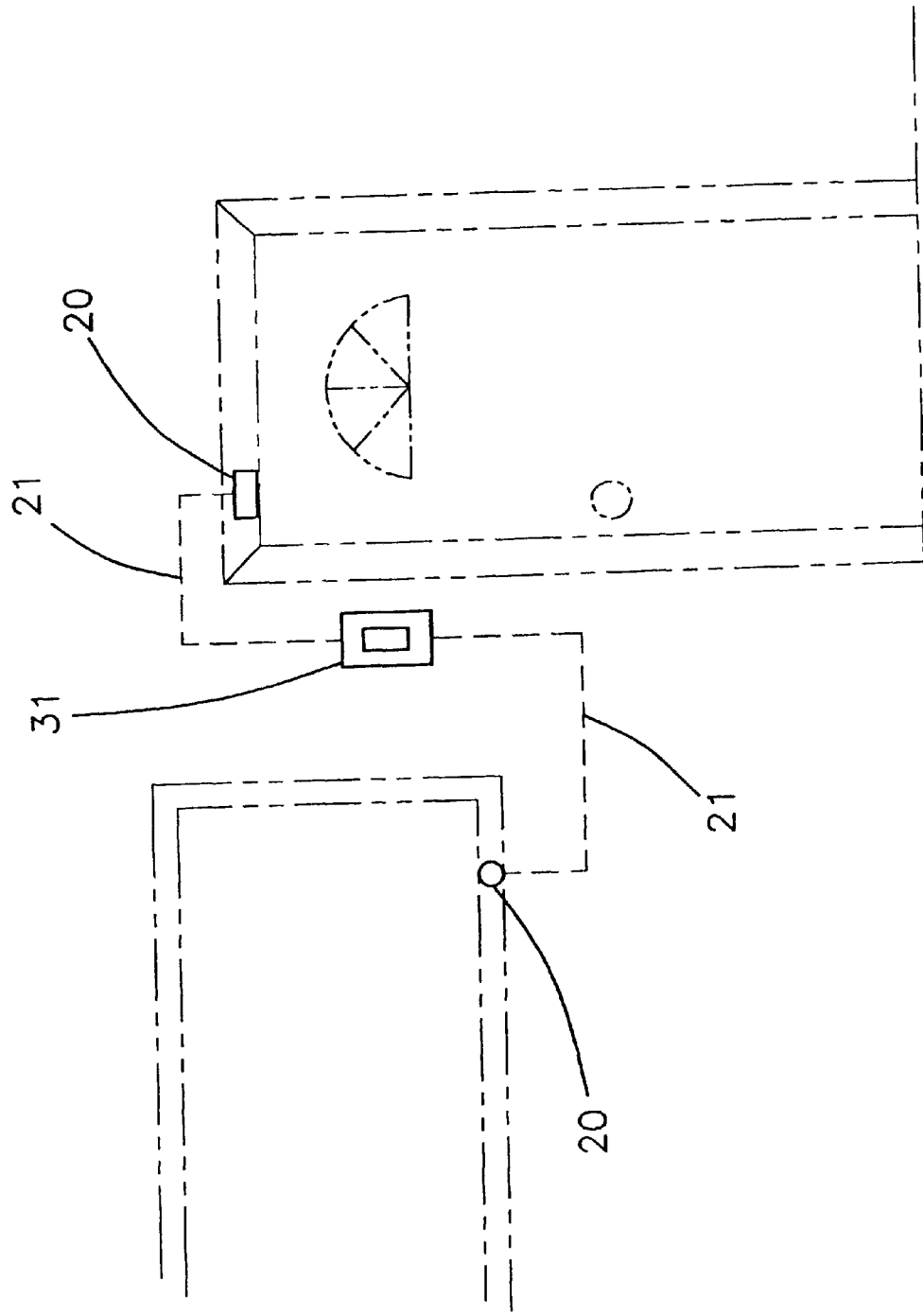
FIG. 4 is a front elevational view of the present invention attached to a door and windows.

With reference now to the drawings, and in particular to FIGS. 1 through 4 thereof, a new telephone security system embodying the principles and concepts of the present invention and generally designated by the reference numeral 10 will be described.

As best illustrated in FIGS. 1 through 4, the telephone security system 10 generally comprises a telephone 11 being adapted to be connected to a telephone line and having a housing 12, a face plate member 13 being removably disposed upon a top of the housing 12, and a ringer being conventionally disposed in the housing 11. A ringer-inducer member 14 is adapted to be connected to the telephone line. The ringer-inducer member is also adapted to cause the telephone 11 to ring upon the ringer-inducer member receiving a signal, and has an on/off switch.

A detection assembly is conventionally connected to the ringer-inducer member 14 for sensing an emergency. The detection assembly includes a smoke detector 16 being conventionally connected to the ringer-inducer member 14 with wires 17 being adapted to be conventionally building structure, and also includes a heat/flame sensor 18 being conventionally connected to the ringer-inducer member 14 with wires 19 and being adapted to be conventionally disposed in the building structure, and further includes intrusion sensors 20 being adapted to be conventionally disposed on windows and doors and being connected to the on/off switch 31 of the ringer-inducer member 14 with wires 21.

A user notification assembly is conventionally connected to the telephone 11 for notifying a user of an emergency such as a break-in, detection of gas and carbon monoxide, or the telephone 11 ringing. The user notification assembly includes light-emitting members 22,23 being securely and conventionally disposed in the housing 11 and being adapted to shine lights through the face plate member 13 upon the telephone 11 ringing. The light-emitting members 22,23 include a green light-emitting member 22 being adapted to emit a green light upon the telephone 11 ringing. The light-emitting members 22,23 also include a red light-emitting member 23 being adapted to emit a red light upon the telephone 11 ringing as a result of the ringer-inducer member 14. The light-emitting members 22,23 are conventionally disposed near a front of the housing 12. The user notification assembly also includes a wrist band 24 being adapted to be worn about a wrist of the user, and further includes a plurality of vibrator members 27 being spaced apart and being conventionally disposed in and along a length of the wrist band 24. The vibrator members 27 are interconnected with wires 28 and are connected to the telephone 11 with wires 28. The vibrator members 27 vibrate when the telephone 11 is ringing to notify a hearing-impaired user of the telephone 11 ringing. The wrist band 24 has ends 25,26 which are fastened together with fastening members 29,30. The fastening members 29,30 are generally strips of hook and loop fasteners which are securely and conventionally attached at the ends 25,26 of the wrist band 24 and which are fastenable to one another for securing the wrist band 24 about the wrist of a user. The telephone 11 is capable of emitting distinctive rings depending upon which of the detectors 16 and sensors 18,20 sends a signal to the ringer-inducer member 14.

In use, the user will be notified in addition to any other alarms, by the telephone 11 if someone is trying to break into the building through windows or doors or if there is a fire or smoke in the building or, additionally, if there is detection of natural gas, radon gas, or carbon monoxide. In addition, hearing-impaired users will be notified of the telephone 11 ringing by the vibrator members 27 in the wrist band 24 worn by the hearing-impaired users.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A telephone security system comprising:
a telephone being adapted to be connected to a telephone line and having a housing and a face plate member being removably disposed upon a top of said housing and also having a ringer disposed in said housing;
a ringer-inducer member being adapted to be connected to the telephone line;
a detection assembly being connected to said ringer-inducer member for sensing an emergency;
a user notification assembly being connected to said telephone for notifying a user of an emergency or said telephone ringing; and
wherein said user notification assembly also includes a wrist band being adapted to be worn about a wrist of the user, and further includes a plurality of vibrator members being spaced apart and being disposed in and along a length of said wrist band, said vibrator members being interconnected with wires and being connected to said telephone with wires, said vibrator members vibrating upon said telephone ringing to notify a hearing-impaired user of said telephone ringing, said wrist band comprising a pliable material such that said pliable material is adapted for conforming to a wrist of the user to provide comfort when the user is wearing said wrist band.

2. A telephone security system as described in claim 1, wherein said ringer-inducer member is adapted to cause said telephone to ring upon said ringer-inducer member receiving a signal, said ringer-inducer member also having an on/off switch.

3. A telephone security system as described in claim 2, wherein said detection assembly includes a smoke detector being connected to said ringer-inducer member with wires and being adapted to be disposed in a building structure, and also includes a heat/flame sensor being connected to said ringer-inducer member with wires and being adapted to be disposed in the building structure, and further includes intrusion sensors being adapted to be disposed on windows and doors and being connected to said on/off switch on said ringer-inducer member with wires.

4. A telephone security system as described in claim 3, wherein said user notification assembly includes light-emitting members being securely disposed in said housing and being adapted to shine lights through said face plate member upon said telephone being activated, said light-emitting members including a green light-emitting member being adapted to emit a green light upon said telephone ringing, said light-emitting members also including a red light-emitting member being adapted to emit a red light upon said telephone being activated by said ringer-inducer member, said light-emitting members being disposed near a front of said telephone.

5. A telephone security system as described in claim 1, wherein said wrist band has ends which are fastened together with fastening members.

6. A telephone security system as described in claim 5, wherein said fastening members are generally strips of hook and loop fasteners which are securely attached at said ends of said wrist band and which are fastenable to one another for securing said wrist band about the wrist of a user.

7. A telephone security system comprising:
a telephone being adapted to be connected to a telephone line and having a housing and a face plate member being removably disposed upon a top of said housing;
a ringer-inducer member being adapted to be connected to the telephone line, said ringer-inducer member being adapted to cause said telephone to ring upon said ringer-inducer member receiving a signal, said ringer-inducer member also having an on/off switch;
a detection assembly being connected to said ringer-inducer member for sensing an emergency, said detection assembly including a smoke detector being connected to said ringer-inducer member with wires and being adapted to be disposed in a building structure, and also including a heat/flame sensor being connected to said ringer-inducer member with wires and being adapted to be disposed in the building structure, and further including intrusion sensors being adapted to be disposed on windows and doors and being connected to said on/off switch of said ringer-inducer member with wires; and
a user notification assembly being connected to said telephone for notifying a user of an emergency and said telephone ringing, said user notification assembly including light-emitting members being securely disposed in said housing and being adapted to shine lights through said face plate member upon said telephone being activated, said light-emitting members including a green light-emitting member being adapted to emit a green light upon said telephone ringing, said light-emitting members also including a red light-emitting member being adapted to emit a red light upon said telephone being activated by said ringer-inducer member, said light-emitting members being disposed near a front of said housing, said user notification assembly also including a wrist band being adapted to be worn about a wrist of the user, and further including a plurality of vibrator members being spaced apart and being disposed in and along a length of said wrist band, said vibrator members being interconnected with wires and being connected to said telephone with wires, said vibrator members vibrating upon said telephone ringing to notify a hearing-impaired user of said telephone ringing, said wrist band comprising a pliable material such that said pliable material is adapted for conforming to a wrist of the user to provide comfort when the user is wearing said wrist band, said wrist band having ends which are fastened together with fastening members, said fastening members being generally strips of hook and loop fasteners which are securely attached at said ends of said wrist band and which are fastenable to one another for securing said wrist band about the wrist of a user, said telephone being capable of emitting distinctive rings depending upon which of said detectors and sensors sends a signal to said ringer-inducer member.

8. A telephone security system comprising:
a telephone being adapted to be connected to a telephone line and having a housing and a face plate member being removably disposed upon a top of said housing and also having a ringer disposed in said housing;
a ringer-inducer member being adapted to be connected to the telephone line;
a detection assembly being connected to said ringer-inducer member for sensing an emergency;
a user notification assembly being connected to said telephone for notifying a user of an emergency or said telephone ringing; and
wherein said user notification assembly includes a wrist band being adapted to be worn about a wrist of the user, and further includes a plurality of vibrator members being spaced apart and being disposed in and along a length of said wrist band, said vibrator members being interconnected with and being operationally coupled to said telephone, said vibrator members vibrating upon said telephone ringing to notify a hearing-impaired user of said telephone ringing, said wrist band comprising a pliable material such that said pliable material is adapted for conforming to a wrist of the user to provide comfort when the user is wearing said wrist band.

9. A telephone security system as described in claim 8, wherein said ringer-inducer member is adapted to cause said telephone to ring upon said ringer-inducer member receiving a signal, said ringer-inducer member also having an on/off switch.

10. A telephone security system as described in claim 8, wherein said detection assembly includes a smoke detector being operationally coupled to said ringer-inducer member being adapted to be disposed in a building structure.

11. A telephone security system as described in claim 8, wherein said detection assembly includes a heat/flame sensor being operationally coupled to said ringer-inducer member and being adapted to be disposed in the building structure.

12. A telephone security system as described in claim 8, wherein said detection assembly further includes intrusion sensors being adapted to be disposed on windows and doors and being operationally coupled to said on/off switch on said ringer-inducer member.

13. A telephone security system as described in claim 8, wherein said user notification assembly includes light-emitting members being securely disposed in said housing and being adapted to shine lights through said face plate member upon said telephone being activated.

14. A telephone security system as described in claim 13, wherein said light-emitting members include a green light-emitting member being adapted to emit a green light upon said telephone ringing, said light-emitting members also including a red light-emitting member being adapted to emit a red light upon said telephone being activated by said ringer-inducer member.

15. A telephone security system as described in claim 13, wherein said light-emitting members are disposed near a front of said telephone.

16. A telephone security system as described in claim 8, wherein said wrist band has ends which are fastened together with fastening members.

17. A telephone security system as described in claim 16, wherein said fastening members are generally strips of hook and loop fasteners which are securely attached at said ends of said wrist band and which are fastenable to one another for securing said wrist band about the wrist of a user.

* * * * *